(12) United States Patent
Hutchins et al.

(10) Patent No.: US 8,795,475 B2
(45) Date of Patent: Aug. 5, 2014

(54) SYSTEM AND METHOD FOR RECYCLING OF CARBON-CONTAINING MATERIALS

(75) Inventors: Richard Hutchins, Rhyl Flintshire (GB); Michael Walker, Rhyl Flintshire (GB); Paul Archer, Rhyl Flintshire (GB)

(73) Assignee: Used Tyre Distillation Research Limited, Rhyl, Flintshire (GB)

( * ) Notice: Subject to any disclaimer, the term of this patent is extended or adjusted under 35 U.S.C. 154(b) by 1104 days.

(21) Appl. No.: 12/520,530

(22) PCT Filed: Dec. 19, 2007

(86) PCT No.: PCT/GB2007/050771
§ 371 (c)(1),
(2), (4) Date: Jan. 11, 2010

(87) PCT Pub. No.: WO2008/075105
PCT Pub. Date: Jun. 26, 2008

(65) Prior Publication Data
US 2010/0133085 A1 Jun. 3, 2010

(30) Foreign Application Priority Data
Dec. 19, 2006 (GB) .................. 0625250.6

(51) Int. Cl.
*C10B 1/10* (2006.01)
*C10B 47/30* (2006.01)
*C10B 51/00* (2006.01)
*C10B 53/07* (2006.01)
*C10G 1/10* (2006.01)

(52) U.S. Cl.
CPC .......... *C10B 53/07* (2013.01); *C10G 2300/202* (2013.01); *C10G 1/10* (2013.01); *C10B 51/00* (2013.01); *C10G 2400/22* (2013.01); *C10G 2300/1003* (2013.01); *C10G 2400/20* (2013.01); *C10G 2400/30* (2013.01); *C10B 1/10* (2013.01); *C10G 2300/4081* (2013.01); *C10B 47/30* (2013.01)
USPC ...... 201/29; 201/3; 201/25; 201/32; 202/108; 202/131; 202/216; 202/249

(58) Field of Classification Search
CPC .......... C10B 1/10; C10B 47/30; C10B 51/00; C10B 53/07; C10G 1/10
USPC ............ 201/3, 8, 15, 25, 29, 32, 33; 202/108, 202/128, 129, 131, 136, 216, 218, 249; 423/449.7; 585/241
See application file for complete search history.

(56) References Cited

U.S. PATENT DOCUMENTS

| | | | |
|---|---|---|---|
| 1,350,627 A * | 8/1920 | Ten Broeck et al. | 202/262 |
| 3,617,472 A | 11/1971 | Schlinger | |
| 4,439,209 A * | 3/1984 | Wilwerding et al. | 48/76 |
| 5,008,005 A | 4/1991 | Shang | |
| 5,095,040 A | 3/1992 | Ledford | |
| 5,728,361 A | 3/1998 | Holley | |
| 6,814,940 B1 | 11/2004 | Hiltunen et al. | |
| 2002/0094315 A1 | 7/2002 | Mengel et al. | |

FOREIGN PATENT DOCUMENTS

| | | |
|---|---|---|
| WO | 8808020 | 10/1988 |
| WO | 9918171 | 4/1999 |
| WO | 0144405 | 6/2001 |
| WO | 02083816 | 10/2002 |

OTHER PUBLICATIONS

International Application No. PCT/GB2007/050771, International Search Report and Written Opinion, Mar. 25, 2008.
International Application No. PCT/GB2007/050771, International Preliminary Report on Patentability, Apr. 24, 2009.
Patent Application No. GB0625250.6, Search Report, Apr. 19, 2007.
Patent Application No. GB0625250.6, Examination Report, Nov. 16, 2011.

* cited by examiner

*Primary Examiner* — Jill Warden
*Assistant Examiner* — Joye L Woodard
(74) *Attorney, Agent, or Firm* — Sheppard, Mullin, Richter & Hampton LLP

(57) ABSTRACT

There is described a system and method for recycling carbon-containing material, in particular tires and plastics materials. The system includes a heating arrangement for anaerobically heating carbon containing material to produce carbon-containing gases. A condensing arrangement is also used to condense a proportion of the carbon-containing gases to provide condensed gases and non-condensed gases. In addition, a recirculating arrangement is provided for recirculating the non-condensed gases into the heating arrangement. Further systems and methods for pre- and post-processing of the carbon-containing material are also disclosed and products of the systems and methods are also described.

38 Claims, 3 Drawing Sheets

SYSTEM AND METHOD FOR RECYCLING OF CARBON-CONTAINING MATERIALS

FIELD OF THE INVENTION

The present invention relates generally to recycling of carbon-containing materials, particularly vehicle tyres and plastics. More specifically, the present invention is directed to methods for recycling such carbon-containing materials, suitable apparatuses for processing these materials and to uses of such recycled materials.

BACKGROUND TO THE INVENTION

The disposal of carbon-containing materials, such as used vehicle tyres and plastics used in the fabrication of vehicles, has been a long standing problem. A European Directive banning the disposal of used vehicle tyres in landfill sites has substantially reduced the opportunities for disposal. Disposal costs have consequently increased and there is, thus a greater, incentive to dispose of used tyres by illegal dumping, and/or the formation of tyre mountains. The prices of oil and carbon black, both constituents of vehicle tyres, have also been gradually increasing.

Further, the End-of-Life Vehicles Directive is also making it more difficult for vehicle dismantlers to dispose of plastics materials used in the fabrication of vehicles.

Accordingly, the recycling of carbon-containing materials, such as (but not limited to) vehicle tyres and plastics, has thus become more desirable, and a number of processes have been proposed to achieve this. Examples of such processes, which use pyrolysis to pyrolyse carbon-containing materials to produce usable products, are described in U.S. Pat. No. 6,221,329 and U.S. Pat. No. 7,101,463, both assigned to Metso Minerals Industries, Inc.

It is therefore desirable to provide an improved system and method for recycling carbon-containing materials so as to enable the recovery of useful products, including oil, from the carbon-containing materials. References herein to carbon-containing materials preferably imply hydrocarbon and hydrocarbon derivatives including plastics and rubber, typically synthetic. The materials may also include carbon in the form of carbon black.

BRIEF DESCRIPTION OF THE INVENTION

Aspects of the invention are set out in the independent claims and preferred features of the aspects are set out in the dependent claims and in the description below. Preferred features of one aspect may be applied to other aspects.

According to one aspect of the present invention, there is provided a system for recycling carbon-containing material, the system comprising:
(i) a heating arrangement (such as a kiln, rotary kiln or system of fluidized beds) for anaerobically heating carbon-containing material to produce carbon-containing gases;
(ii) a condensing arrangement for condensing a proportion of the carbon-containing gases to provide condensed gases and non-condensed gases; and
(iii) a recirculating arrangement for recirculating the non-condensed gases to the heating arrangement (e.g. for reintroduction into the heating arrangement and/or for providing heating for the heating arrangement).

The heating arrangement may comprise any device suitable for pyrolyzing carbon-containing materials such as a pyrolysis reactor, which may take the form of and/or comprise a kiln (which itself may comprise a rotary screw therein for the transport of the carbon-containing material), rotary kiln and/or fluidized bed.

The heating arrangements of the present invention comprise at least both inlets and outlets allowing for introduction of the carbon-containing material feed, removal of solid products, removal of gas and introduction of gas.

In addition, the heating arrangements of the present invention comprise heating means for pyrolzing the carbon-containing material within the heating arrangement. An advantage of the systems of the present invention is that non-condensed gas from the heating arrangements obtained during pyrolysis may be used to power (or partially power) the heating means, for example, by combustion of the gas.

Suitable temperatures for operating the system of the present invention are typically greater than 400° C., preferably greater than 450° C., more preferably greater than 550° C. A suitable temperature range for operating the systems of the present invention is between 400° C. and 800° C., preferably less than 750° C., and more preferably less than 700° C.

Suitable pressures for operating the systems of the present invention include pressures close to atmospheric such as (101.3 KPa)±7500 Pa.

The inclination of the heating arrangement may be variable and the upstream end may be located above the downstream end. As noted above, the heating arrangement may include a rotary drum which may form part of a rotary kiln. In general, the heating arrangement may be inclined along its longitudinal axis at an angle in the order up to 10°, and preferably of 3.5° to the horizontal. It will be readily apparent to persons skilled in the art that the degree of inclination is dependent on the rate of through-flow of carbon-containing material desired, which is itself dependent on the pyrolysis conditions, and whether the heating arrangement comprises other means for movement of the carbon containing feed, such as a rotary screw. For example, where the reactor temperature is lower, it is generally desirable for the degree of inclination to be less, and vice versa. A sensor may be used to monitor to the degree of inclination of the reactor, and indeed control the degree of inclination depending on the reaction conditions, and therefore the rate of pyrolysis of the materials within the reactor.

The recirculating arrangement in its simplest form may be used to control the amount of non-condensable gases recirculated to the heating arrangement, for example to control the pressure in the heating arrangement, the rate of heating of the carbon-containing feed and/or the amount of heating provided to the heating arrangement by the heating means.

Preferably during operation of the system, the heating means, particularly where a pyrolysis reactor such as kiln is used, is maintained at close to atmospheric pressure, for example, 101325 Pa±5000 Pa, preferably ±1000 Pa, more preferably ±500 Pa, and most preferably ±20 to 100 Pa. In one embodiment, the pressure is preferably above atmospheric pressure to prevent oxygenated gases from entering the system.

The recirculating arrangement may be operable to control pressure within the heating means by varying the amount of non-condensed gases recirculated to the heating arrangement to maintain the pressure in the heating arrangement at a desired value, for example, at close to atmospheric pressure.

The heating arrangement may include upstream and downstream ends and the system may include a feed arrangement for introducing the carbon-containing material to be recycled into the heating arrangement, possibly into the upstream end, and may include a discharge arrangement for discharging solid material produced as a result of heating the carbon-containing material, possibly at the downstream end.

The system may be operable to extract the carbon-containing gases from the upstream end of the heating arrangement for supply to the condensing arrangement. It has been surprisingly found by the inventors that withdrawal of the gases from the upstream end results in the gases containing less particulate matter, such as carbon particles. It will be appreciated that this is advantageous as any particulate matter in the gases extracted will generally need to be removed, for example, by use of filters.

The recirculating arrangement may be operable to recirculate the non-condensed gases to the heating arrangement by introducing the non-condensed gases into the heating arrangement upstream of the discharge arrangement, between the upstream and downstream ends of the heating arrangement and/or proximal to the upstream end. It will also be appreciated that the use of the recirculated gases provides for a number of advantages. Firstly, where the gas is introduced proximal to the upstream end, it may be used to heat, preferably rapidly heat (more preferably to temperatures in excess of 200 to 300° C.), the carbon-containing feed, thereby both increasing the rate of pyrolysis, and reducing the likelihood of the carbon-containing feed 'sticking' to the surfaces of the reactor. A further benefit is that the gas, which is still hot, may be used to maintain the internal temperature of the reactor. This is particularly useful where the heating means does not provide uniform heat to the reactor, for example, where a rotary kiln is used.

The recirculating arrangement may additionally be operable to preheat the carbon-containing feed before its introduction into the heating arrangement.

The recirculating arrangement may include a fan which may be operable to control the recirculation of non-condensed gases to the heating arrangement.

The recirculating arrangement may include one or more recirculation valves which may be operable to control the recirculation of non-condensed gases to the heating arrangement, or other parts of the system. By way of example, the valves may be used to control the amount of non-condensed gases that are recirculated to the heating arrangement (including where desired the location of the recirculation within the heating arrangement), control the amount of non-condensed gases that are passed to the heating means, control the amount of non-condensed gases that are passed for further processing and/or storage.

Such control as discussed above, for example of fan and/or the recirculation valve, also allows control of the rate of pyrolysis within the heating arrangement, and in particular the pressure and temperature in the heating arrangement.

The system may include a diverter arrangement which may be selectively operable to divert a proportion of the non-condensed gases prior to recirculation to the heating arrangement. The system may include gas storage means and the diverter arrangement may be operable to divert said proportion of the non-condensed gases to the gas storage means. The heating arrangement, which preferably comprises a gas-fired burner, and the system may be operable to provide gases from the gas storage means to the burner to operate the burner.

The feed arrangement may include a rotatable feed screw which may be rotatable independently of the pyrolysis reactor, for example a rotary drum, and which may have an input end located outside the reactor and which may have an output end located inside the reactor. The feed arrangement may include a scraper which may be located at the output end of the rotatable feed screw and which may be in contact with an inner surface of the reactor to dislodge material from the inner surface of the reactor.

The condensing arrangement may include a condenser which may be operable to cool the carbon-containing gases to a temperature in the order of between 15° C. and 25° C. to provide the condensed gases and non-condensed gases.

The system may include a filtration arrangement for filtering the non-condensed gases provided by the condensing arrangement prior to recirculation to the heating arrangement. The system may be operable to pass the non-condensed gases through a reservoir containing condensed hydrocarbons prior to supplying the non-condensed gases to the filtration arrangement.

In another embodiment, the system comprises a solids outlet for obtaining carbon-containing solids. The outlet may comprise an auger for transporting the material from the outlet, and alternatively may be a hopper system. The carbon-containing solids will inevitably comprise particles of many different sizes as well as other materials such as metals. Such materials may be divided via use of known means such as magnetic separators, and vibratory screen separators. A grinding apparatus may also be used to control and alter the particle size of the solids.

According to another aspect of the present invention, there is provided a method for recycling carbon-containing material, the method comprising:
(i) anaerobically heating carbon-containing material in a heating arrangement to produce carbon-containing gases;
(ii) passing the carbon-containing gases through a condensing arrangement to provide condensed gases and non-condensed gases; and
(iii) recirculating the non-condensed gases to the heating arrangement to provide heating internally and/or externally to the arrangement.

The method of the present invention may be operated as a continuous process or a batch process. However, it will be understood that a continuous process is most advantageous.

The carbon-containing material is preferably in the form of chunks or particles. Suitable diameters, for most embodiments of the present invention, include carbon-containing particles of from 30 to 300 mm, preferably 40 to 200 mm, and most preferably 50 to 150 mm.

It will be understood that the feed may be produced prior to being fed into the heating arrangement so as to alter the particle size of the carbon-containing material, for example, by use of a shredder; and/or to remove large pieces of metal, for example, by use of a magnetic separator.

Where the heating arrangement comprises a rotary kiln, the arrangement is advantageously able to move the carbon-containing material through the kiln without the need for extra mechanical means, for example, a screw thread. This is particularly advantageous as pre-treatment of the material to remove large pieces of metal can be avoided.

During use, it is preferred that the reactor fill, i.e. the amount of material within the reactor for example, a rotary kiln, be no more than 20%, preferably up to 15% and most preferably up to 10%. Preferably the amount of fill within the reactor is monitored by means of a sensor, more preferably a level sensor. The sensor may be located within the reactor.

The non-condensed gases are of course dependent on the carbon-containing feed, but generally comprise volatile gases such as hydrogen, methane and propane.

The step of recirculating the non-condensed gases to the heating arrangement may comprise controlling the amount of non-condensed gases that are recirculated, for example to provide control over the pressure in the heating arrangement (preferably maintaining the pressure close to atmospheric), and/or to control the rate of heating of the heating arrangement.

The method may comprise extracting carbon-containing gases from an upstream end of the heating arrangement for supply to the condensing arrangement.

The upstream end of the heating arrangement may be located above a downstream end such that the heating arrangement may be inclined.

The recirculating step may comprise introducing the non-condensed gases into the heating arrangement at a position between the upstream and downstream ends, proximate the downstream end, or proximate to the upstream end.

The method may comprise discharging solid material produced by the step of anaerobically heating the carbon-containing material from the heating arrangement, possibly at the downstream end.

The method may comprise diverting a proportion of the non-condensed gases prior to recirculation to the heating arrangement. The method may comprise storing the diverted proportion of non-condensed gases. Still further, it will be appreciated that the diverted gas may be used to provide thermal energy such as hot water or steam (for other processes); directed to an electric generator to provide electricity; or even burnt off using a flare.

The method may comprise supplying the stored gases to the heating arrangement to operate heating means used to heat the arrangement.

The present invention also provides for recycled materials obtained using the systems and methods of the present inventions.

The carbon-containing materials used in the systems and methods of the present inventions may be broken down to provide, oil, carbon black, steel, carbon char (from which carbon black may be obtained), low molecular weight hydrocarbon gases (methane, propane and ethane), hydrogen, and other hydrocarbon products (for example, limonene, propylenes, butenes, pentenes, hexenes, benzene and/or toluene). As a further example, the carbon char may be subjected to resonance disintegration to provide an ultrafine product.

It has been found that the systems and methods of the present inventions provide a quality of carbon black not obtained using hitherto known processes, as a result of the product being drier, and comprising fewer residues due to improved vapour extraction. The carbon black may be used as a filler or colouring agent for rubbers and plastics; as a colouring agent for inks, dyes, pigments and dispersions; and even as a fuel additive.

The carbon black or carbon char may further be activated by known processes to enable a large number of additional uses.

It will be appreciated that the products themselves may be sold on, or further processed, for example fractionated, to form purer products such as oil suitable for use as fuel. Preferably, the oil is blended so as to produce a suitable fuel, for example with diesel. In one preferred embodiment, the oil has properties and a quality similar to those of Brent Crude oil.

The calorific value of the oil output by the methods described herein is preferably greater than 30 MJ/kilo, further preferably greater than 40 MJ/kilo.

Still a further benefit is that the oil obtained is relatively low in sulphur compounds (e.g. less than 0.8% sulphur), meaning that further expensive processing to remove such compounds is likely unnecessary.

BRIEF DESCRIPTION OF THE DRAWINGS

An embodiment of the present invention will now be described by way of example only and with reference to the accompanying figures in which.

DETAILED DESCRIPTION OF EMBODIMENTS OF THE INVENTION

Figure 1:
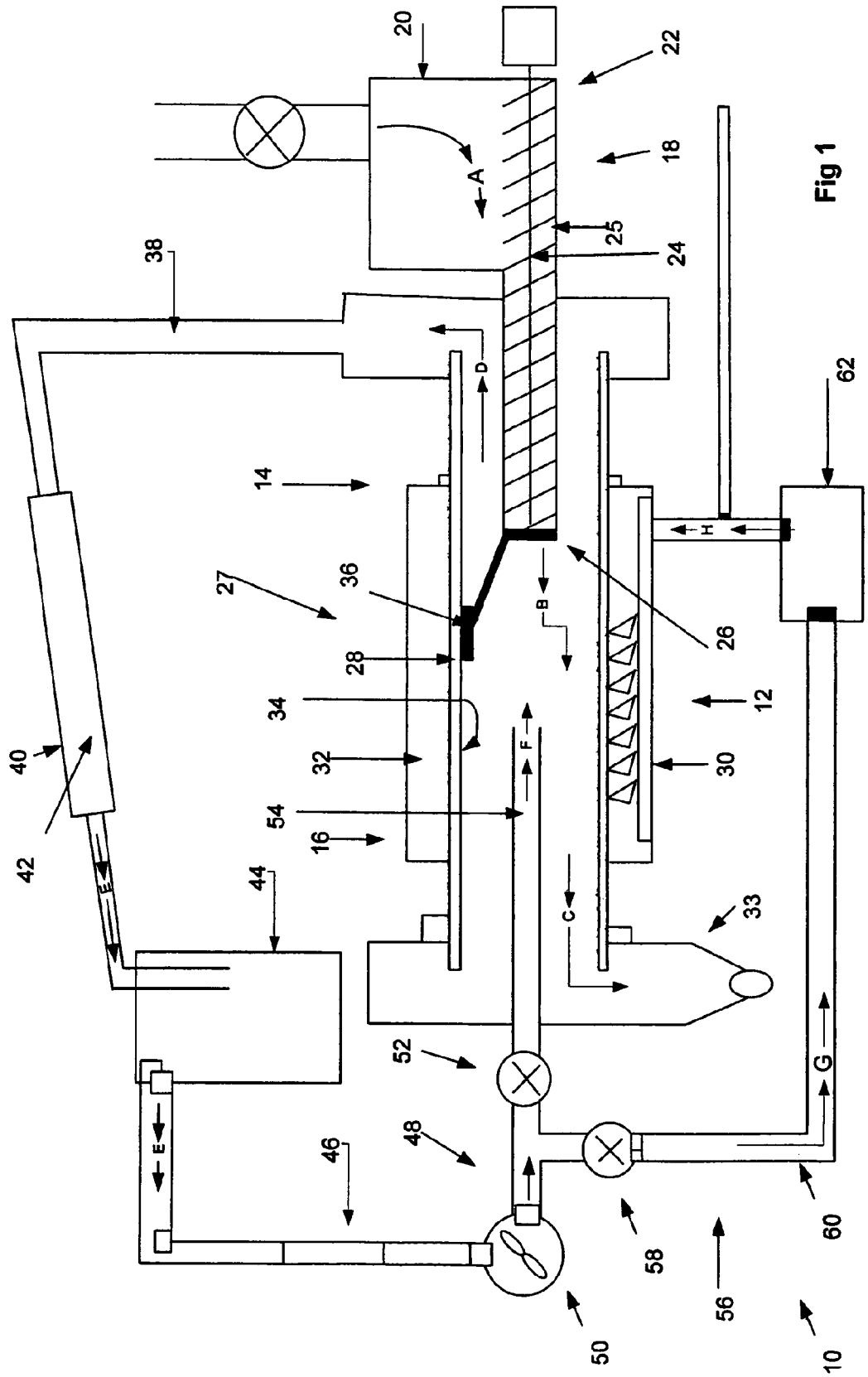
FIG. 1 is a schematic illustration of a system and method for recycling carbon-containing material.

FIG. 1 shows a system 10 for recycling carbon-containing material. Examples of such carbon-containing material include, but are not limited to, waste tyres, waste plastics, tyre shred, rubber crumb and animal waste.

The system 10 includes a heating arrangement, i.e. a pyrolysis reactor, 12 having upstream and downstream ends 14, 16 and a feed arrangement 18 for feeding carbon-containing material into the heating arrangement 12. The feed arrangement 18 includes a feed source 20, such as a hopper, for supplying pieces of carbon-containing material to an input end 22 of a rotatable screw 24 located inside a static feed tube 25. This is indicated by the arrows A.

In the present invention, the diameter of the carbon-containing particle is from 30 to 300 mm, preferably 40 to 200 mm, and most preferably 50 to 150 mm. The individual pieces of carbon-containing material in the present example have a size in the order of 100 mm by 250 mm and these individual pieces are fed by the rotatable screw 24, as a consequence of its rotation, to an output end 26 of the screw 24 and into the heating arrangement 12 proximate the upstream end 14.

The rotational speed of the rotatable screw 24 may be varied and the rotational speed selected will depend on the desired feed rate of carbon-containing material into the heating arrangement 12, and the rate at which the material is being processed. In this regard, it will be appreciated that there are a number of variables which control the rate at which the material may be produced, including but not limited to: material particle size, material particle surface area, reactor temperature, initial particle temperature, rate of transport of material through reactor, reactor pressure, and feed loading within the reactor.

As is apparent from FIG. 1, the heating arrangement 12 is in the form of a rotary kiln 27 and comprises a rotary drum 28 which is rotatable about its longitudinal axis. The rotary kiln 27 includes a gas-fired burner 30 housed in an outer static section 32 of the rotary kiln 27, and the gas-fired burner 30 provides for indirect heating of the 10 rotary drum 28. The upstream end 14 of the rotary drum 28 is located above the downstream end 16 such that the rotary drum 28 is inclined. Accordingly, as the rotary drum 28 rotates, the pieces of carbon-containing material move from the upstream end 14 of the rotary drum 28 towards the downstream end 16, under the action of gravity. This is shown by the arrows B.

The rotational speed and inclination of the rotary drum 28 may be varied to enable the amount of time for which the carbon-containing material is heated inside the rotary drum 28 to be controlled. The rotary drum 28 is preferably rotated at speeds of 4 to 20 revolutions per minute, preferably 6 to 15 per minute, more preferably 8 to 10 per minute. It will be appreciated that speeds of between 30 and 80 rev/min may also be used.

The kiln may also be inclined along its longitudinal axis at an angle in the order of up to 10°, and at angles of preferably 3.5° to the horizontal, with the upstream end 14 located above the downstream end 16 as indicated above. It will be readily apparent to persons skilled in the art that the degree of inclination is dependent on the rate of through-flow of carbon-containing material desired, which is itself dependent on the pyrolysis conditions. For example, where the reactor temperature is lower, it is generally desirable for the degree of inclination to be less, and vice versa.

Typically, the gas-fired burner 30 operates to raise the temperature of the heated zone inside the rotary drum 28 to in the order of greater than 400° C., preferably greater than 450° C., more preferably greater than 550° C. A suitable temperature range for use in the present invention is between 400° C. and 800° C., preferably less than 750° C., and more preferably less than 700° C.

During use, it is preferred that the drum fill, i.e. the amount of material within the rotary drum 28, be no more than 20%, preferably up to 15% and most preferably up to 10%.

As the carbon-containing material fed into the rotary drum 28 moves through the heated zone inside the rotary drum 28, the carbon-containing material is broken down (i.e. undergoes pyrolysis) as a result of the heating process into carbon-containing gases and solid material.

The solid material continues to move towards the downstream end 16 of the rotary drum 28 by virtue of its rotation and inclination and becomes drier as a result of the heating process, and the evaporation of volatiles within the material(s). The solid material is discharged from the downstream end 16 of the rotary drum 28 into a discharge arrangement 33, as shown by the arrows C. The solid material, which will typically include carbon char, and other solid materials that are not broken down by the heating process, can be subjected to further subsequent processing, using conventional techniques, to produce usable products such as carbon black.

In order for the system 10 to operate effectively to break down the carbon-containing material into solid material and carbon-containing gases, the carbon-containing material must be heated anaerobically (i.e. in the substantial absence of oxygen) by the heating arrangement 12 in an inert, oxygen-free, atmosphere. The carbon containing material is thus purged with a suitable gas, for example nitrogen, prior to being fed into the rotary drum 28 by the rotatable feed screw 24. The system 10 may include dump valves (not shown) to enable the carbon-containing material to be isolated whilst it is being purged.

As the carbon-containing material is heated inside the rotary drum 28 it will become sticky and may consequently have a tendency to adhere to an inner surface 34 of the rotary drum 28. In order to prevent a build up of adhered material on the inner surface 34, a scraper 36 may be attached to the static feed tube 25 at the output end 26 of the rotatable feed screw 24, the scraper 36 contacting the inner surface 34 and thereby acting to dislodge any adhered material therefrom. In this regard, it will be understood that a significant advantage of the present invention is the recycling of the non-condensable gases back into the drum. It has been surprisingly found that the introduction of the gases into the drum in proximity to the carbon-containing feed tube 25 increases the rate of heating of the feed thereby reducing the time period during which the material is sticky and therefore reducing the tendency for such material to stick to the inner face.

As indicated above, carbon-containing gases are produced as a result of the breakdown of the carbon-containing material by the heating process in the heating arrangement 12. These carbon containing gases are removed from the upstream end 14 of the rotary drum 28 and are fed, via a conduit 38, to a condensing arrangement 40, as illustrated by the arrows D. It is convenient to remove the carbon-containing gases from the upstream end 14 as the gases will have a natural tendency to flow towards the highest point of the rotary drum 28. Additionally, the gases at this point contain the least amount of entrained carbon-containing particles, making them easier to filter.

The condensing arrangement 40 includes a condenser 42 operating at ambient temperature, typically between 15° C. and 25° C., which cools the carbon-containing gases from the rotary drum 28 to provide both condensed and non-condensed gases. The carbon-containing condensed gases may be subjected to subsequent processing to provide usable products, such as oil.

The non-condensed gases, which have not been cooled to a sufficiently low temperature by the condenser 42 to cause them to condense, are fed through a reservoir 44 of condensed hydrocarbons to remove impurities and through a filtration arrangement 46 where further impurities are removed, as shown by the arrows E.

In the present example, a recirculating arrangement 48, comprising a fan 50 and a recirculation valve 52, and is used to recirculate the non-condensed gases into the heating arrangement 12, as shown by the arrows F. A conduit 54 (which bypasses the discharge arrangement 33) extends into the rotary drum 28 and introduces the non-condensed gases into the rotary drum 28 at a position between the upstream and downstream ends 14, 16, proximate the downstream end 16.

Introduction of the non-condensed gases at a position slightly upstream of the discharge arrangement 33 is advantageous as the gas around the solid material (produced as a by-product of the heating process) as it approaches the discharge arrangement 33 towards the downstream end 16 of the rotary drum is not disturbed. This minimises entrainment of any particles of the solid material by the gases as they flow from the conduit 54 along the longitudinal axis of the rotary drum 28 towards the upstream end 14.

The fan 50 imparts energy to the flow of non-condensed gases and thereby imparts energy to the flow of gases through the rotary drum 28, the condensing arrangement 40, the reservoir 44 and the filtration arrangement 46, as will be evident to those skilled in the art.

If any fine carbon particles are entrained in the flow of non-condensed gases as the gases pass from the conduit 54 towards the upstream end 14 and towards the conduit 38 where the carbon-containing gases are extracted from the rotary drum 28, these carbon particles tend to adhere to the carbon-containing material towards the upstream end 14 of the rotary drum 28, as the carbon-containing material is more sticky towards the upstream end 14. As the carbon-containing material moves from the upstream end 14 of the rotary drum 28 towards the downstream end 16, it will become drier as a result of the heating process which causes its separation into solid material and carbon-containing gases, as explained above.

As carbon-containing gases are produced by the breakdown of the carbon-containing material in the rotary drum 28, the pressure in the rotary drum will generally decrease. In accordance with embodiments of the invention, the recirculating arrangement 48, and in particular the fan 50 and the recirculation valve 52, are operable to control the amount of non-condensed gases recirculated to the rotary drum 28 via the conduit 54, thus enabling the pressure in the rotary drum 28 to be carefully controlled within predetermined upper and lower limits. The control may be manual or provided by an electronic control system.

By controlling the amount of non-condensed gases introduced into the rotary drum 28, the internal pressure of the rotary drum 28 can be balanced so that it is substantially equal to the external (atmospheric) pressure.

A benefit of controlling the pressure inside the rotary drum 28, or for the matter any other type of pyrolysis reactor system, is that leakage of air into the rotary drum 28 through the seals or the leakage of carbon-containing gases from the rotary drum 28 to atmosphere can be minimised. This is extremely important since the reactive carbon-containing gases inside the rotary drum 28 are heated by the heating arrangement 12 to temperatures in excess of their ignition point. Any mixing of these heated reactive gases with the correct proportion of oxygen-containing air will produce an explosion if the gases in the mixture are above their ignition temperature, and at very least will present a significant explosion risk if the gases in the mixture are below their ignition temperature. Whilst mechanical seals can be relied upon to some extent to prevent the ingress of air into, or the escape of reactive gases from, the rotary drum 28, the effectiveness of the seals cannot be guaranteed. Embodiments of the invention thus provide a significant advantage over the prior art.

Recirculation of non-condensed gases into the rotary drum 28 by the recirculation arrangement 48 also enhances the removal of the carbon-containing gases, produced as a result of the heating process, to the condensing arrangement 40, due to the continuous flow of gases that l0 is caused by operation of the fan 50. Relying on the chemical reaction caused by the heating process to provide sufficient pressure to remove the carbon-containing gases from the rotary drum 28 has been found to be inadequate and is one of the disadvantages associated with the prior art processes.

As indicated above, the atmosphere inside the rotary drum 28 must not contain oxygen to permit anaerobic heating of the carbon-containing material. Whilst a gas, such as nitrogen, could be injected into the rotary drum 28 to control the internal pressure and promote the flow of carbon-containing gases from the rotary drum 28 to the condensing arrangement 40, the use of such a gas would be expensive, and thereby undermine the economic viability of the system 10. The introduction of nitrogen into the rotary drum would also cause a significant and undesirable temperature increase in the heated zone inside the rotary drum 28. By recirculating non-condensed gases which originate from the rotary drum 28 back to the rotary drum 28 to control the pressure and enhance the removal of carbon-containing gases, embodiments of the invention thus provide significant advantages over the prior art.

It may be unnecessary to recirculate all of the non-condensed gases to the rotary drum 28 to maintain the desired pressure and flow characteristics. 30 Accordingly, the system 10 includes a diverter arrangement 56 which is selectively operable to divert a proportion of the non-condensed gases, prior to recirculation into the rotary drum 28 via the conduit 54. In embodiments the invention, the diverter arrangement 56 includes a diverter valve 58, which when open or partially open, diverts at least a proportion of the non-condensed gases along a conduit 60, as shown by the arrows G. The diverted non-condensed gases, which may be passed through a scrubber (not shown), may be stored in a gas storage tank 62 and may be fed to the gas-fired burner 30 to operate the burner 30, as shown by the arrows H, thus further improving the efficiency of the system 10.

There is thus provided a system 10 and method for the continuous recycling 10 of carbon-containing material which provides significant advantages over the prior art. In particular, by providing a recirculating arrangement 48 which is operable to recirculate non-condensed gases to the heating arrangement 12, the pressure in the heating arrangement 12 can be carefully controlled and the removal of carbon-containing gases from the heating arrangement 12 can be optimised.

Although embodiments of the invention have been described in the preceding paragraphs with reference to various examples, it should be appreciated that various modifications to the examples given may be made without departing from the scope of the present invention, as claimed.

For example, any suitable feed arrangement 18 may be employed to feed carbon-containing material into the heating arrangement 12. The heating arrangement 12 may operate using means other than a gas-fired 25 burner 30. For example, electrical heating could be employed.

The condenser 42 may operate at any suitable temperature to condense the carbon-containing gases from the rotary drum 28. The condensing arrangement 40 could include more than one condenser 42, the condensers 42 operating at different temperatures, and even allow for fractionation.

The diverter arrangement 56 may vent a proportion of the diverted non-condensed gases to atmosphere. However, this would be less economically desirable than reusing those diverted gases to operate the gas-fired burner 30. The non-condensed gases provided by the diverter arrangement 56 may be used as an alternative to nitrogen or another gas to purge the carbon-containing material prior to being fed into the rotary drum 28 by the rotatable feed screw 24.

The rotary drum 28 may be rotated at any desired speed and may be inclined at any desired angle.

Figure 2:
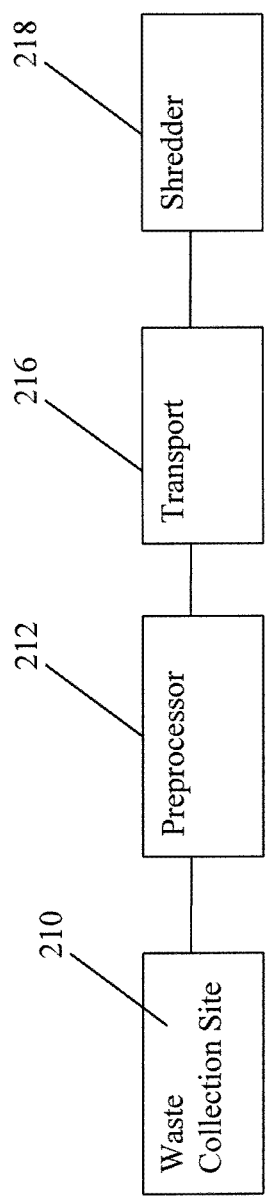
FIG. 2 is a schematic illustration of a recycling process according to one embodiment.

A process for recycling carbon-containing materials, in particular vehicle tyres and plastics, will now be described in more detail with reference to FIG. 2.

Carbon-containing materials are collected for recycling at a waste collection site 210. This may be a site specifically designed for collecting a particular type of product for recycling, for example a tyre yard, or the materials may be collected together with other waste products, for example at a junk yard. If necessary, the carbon-containing materials are separated from any other large items of waste that are not recyclable using the present process. It is noted, however, that it is not necessary to remove all non-recyclable materials in the present process. For example, tyres may not be separated from pieces of metal that are joined to them.

In the example of the processing of tyres, the tyres are collected with any additional materials attached. A pre-processor component 212 may then be used to compact the tyres. For example, the types may be compacted by stamping the tyres flat and stapling the tyres together. This reduces their volume before any transportation. The materials may also be fragmented at the pre-processor 212, or broken down into large segments for ease of transportation. Alternatively, or in addition, a compressor may be used to compress the tyres before transportation.

The waste products that have been roughly prepared in this way may then be transported 216 by any convenient means, preferably by road or rail, to the recycling site.

In one embodiment, the waste collection site may be implemented as part of the recycling site, so the fragmentation, compression and transportation steps may not be necessary.

At the recycling site, the material is shredded 218 to break the material down into the similarly-sized chunks or particles described above. At this stage, although the waste material preferably predominantly comprises carbon-containing materials, such as tyre pieces or plastics materials, the material may contain elements of non-recyclable material, such as metal.

The shredded material can then be used as feedstock for the process described herein.

Figure 3:
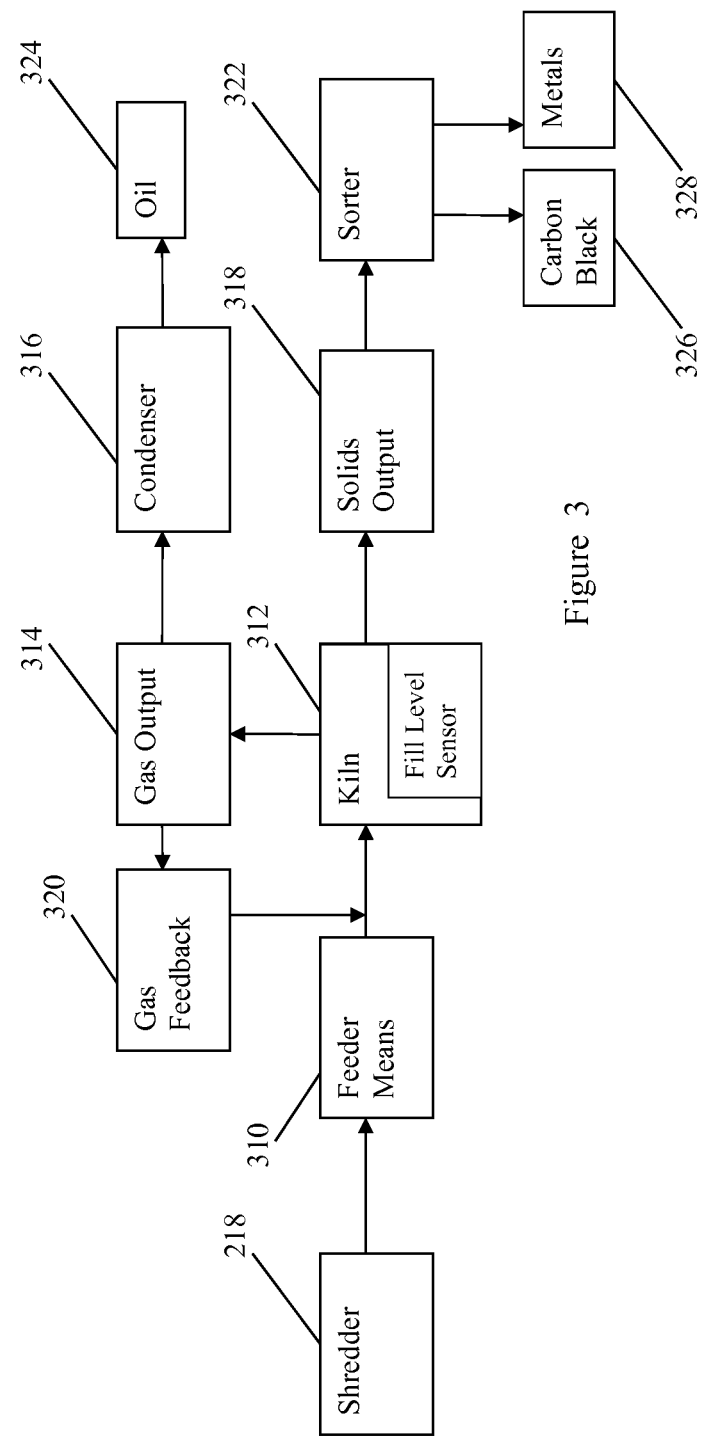
FIG. 3 is a schematic illustration of a recycling system according to one embodiment.

One embodiment of a recycling process and plant is further illustrated with reference to FIG. 3. The recycling plant includes a shredder component 218 to break up the waste materials into similarly-sized particles as described above.

The waste material output from the shredder 218 is input into a feeder component 310, for example a hop or other suitably-sized container, to be fed into the recycling process. It will be appreciated that the shredder 218 and feeder 310 components may be decoupled in one embodiment so that the product of the shredder 218 is stored for later input to the feeder component 310.

The feeder 310 includes a mechanism for transferring the feedstock into a kiln 312. The mechanism may include a feed screw or auger or may be implemented using one or more hoppers.

The kiln 312 operates according to the process described above to generate both a gaseous output 314 and a solids output 318. The solids output 318 may include carbon black, carbon char and metal materials. The solids output 318 feeds into a sorter device 322 for sorting of the solids into their component parts, which may include carbon black 326 and metals 328. The solid components have a variety of uses as described above and are of a significantly smaller volume than the input feedstock.

The gaseous output 314 is preferably split into at least two component parts. Some of the gas is fed into a gas feedback system 320, from which it may be used to maintain the pressure in the kiln 312, provide energy to the kiln and/or heat the incoming feedstock.

A further part of the gas is fed into a condensor component 316 to condense the gas into oil 324 for later use as an energy source as described above.

In a further embodiment, the output gas may be burned directly on site (not illustrated) to produce electricity, which may be supplied to local sites or fed into the national grid. Also, heat may be extracted from the gaseous and/or solids outputs via a heat exchanger mechanism (not shown) to supply heat energy to the local area, for example via a Combined Heat and Power system.

The gas output 314 is illustrated in the present embodiment as being split before compression. However, it is noted that the gas may first be condensed 316 and then a portion of the non-condensed gases may be directed back into the recycling system.

It will be appreciated by one skilled in the art that steps of the processes described above may be omitted or performed in a different order and further processing steps may be added. The processing performed may depend on the type and quality of the input material obtained.

Whilst endeavouring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

The invention claimed is:

1. A method for recycling carbon-containing material comprising used vehicle tyres, the method comprising:
   (i) introducing, after preheating, carbon-containing material comprising shredded vehicle tyres with lateral dimensions up to about 300 mm and including metal reinforcement into an upstream end of a heating arrangement;
   (ii) anaerobically heating the carbon-containing material in a heating arrangement including heating means and comprising a rotary kiln having an inclined rotary drum having a longitudinal axis and upstream and downstream ends, the upstream end being higher than the downstream end, to produce by pyrolysis carbon-containing gases, solid carbon and metal fragments;
   (iii) discharging solid material produced as a result of heating the carbon-containing material at a discharge arrangement at the downstream end;
   (iv) condensing a proportion of the carbon-containing gases to provide condensed gases including at least one oil fraction and non-condensed gases;
   (v) recirculating, via a recirculation valve of a recirculation arrangement, the non-condensed gases into an interior of the rotary drum of the heating arrangement at an introduction point upstream of and proximate to the discharge arrangement, the introduction point being arranged along the longitudinal axis of the rotary drum, whereby during operation solids flow to the downstream end of the rotary drum to be discharged by the discharge arrangement and the non-condensed gases flow within the rotary drum upstream from the introduction point to an extraction point adjacent the upstream end and comprising causing the carbon-containing gases to preheat the carbon-containing material before its introduction into the upstream end;
   (vi) controlling the temperature in the heating arrangement to a temperature of greater than 400° C. and less than 800° C., including controlling an amount of non-condensed gases recirculated into the interior of the rotary drum during pyrolysis of the carbon-containing material;
   (vii) adjusting the recirculation valve to control the amount of non-condensed gases recirculated into the interior of the rotary drum during pyrolysis of the carbon-containing material to control pressure in the rotary drum to approximately atmospheric pressure ±7500 Pa;
   (viii) obtaining carbon-containing solids from the discharge arrangement; and
   (ix) separating metals from the carbon-containing solids.

2. A method according to claim 1 further comprising sensing a fill level of the rotary drum.

3. A method according to claim 2 further comprising maintaining the fill level of the rotary drum at less than 20%.

4. A method according to claim 1 further comprising using the non-condensed gases to power, or partially power, the heating means.

5. A method according to claim 1 wherein the non-condensed gases include at least one volatile gas, preferably comprising hydrogen, methane or propane.

6. A method according to claim 1 wherein the inclination is along the longitudinal axis and at an angle of up to 10°.

7. A method according to claim 1 further comprising extracting the carbon-containing gases from the upstream end of the heating arrangement and supplying the gases to a condensing arrangement.

8. A method according to claim 1 further comprising selectively diverting a proportion of the non-condensed gases to gas storage means.

9. A method according to claim 1 further comprising operating a condensing arrangement at a temperature of between 15° C. and 25° C.

10. A method according to claim 1 further comprising processing used vehicle tyres to generate the carbon-containing material.

11. A method according to claim 10 further comprising shredding received vehicle tyres or tyre fragments.

12. A method according to claim 10 further comprising removing large pieces of non-carbon-containing material prior to recycling the carbon-containing material.

13. A method according to claim 1 further comprising storing at least a portion of the non-condensed gases, preferably as compressed gases.

14. A method according to claim 1 wherein the at least one oil fraction is suitable for use as or blending with a diesel fuel.

15. A method according to claim 1 further comprising heating the carbon-containing material in an inlet heating zone.

16. A method according to claim 15 wherein the carbon-containing material is heated, at least partially, using the non-condensed gases.

17. A method according to claim 15 wherein the carbon-containing material is heated to a temperature of greater than 300° C. in a time of less than 60 seconds.

18. A method according to claim 1 wherein the method is performed continuously.

19. A system for recycling carbon-containing material comprising used vehicle tyres, the system comprising:
(i) a heating arrangement including heating means and a rotary kiln having an inclined rotary drum having a longitudinal axis and upstream and downstream ends, the upstream end being higher than the downstream end, the heating arrangement for anaerobically heating carbon-containing material to produce by pyrolysis carbon-containing gases, solid carbon and metal fragments;
(ii) a feed arrangement for introducing carbon-containing material comprising shredded vehicle tyres with lateral dimensions up to about 300 mm and including metal reinforcement into the upstream end;
(iii) a discharge arrangement for discharging solid material produced as a result of heating the carbon-containing material at the downstream end;
(iv) a condensing arrangement for condensing a proportion of the carbon-containing gases to provide condensed gases including at least one oil fraction and non-condensed gases;
(v) a recirculating arrangement, comprising a recirculation valve, for recirculating the non-condensed gases into an interior of the rotary drum of the heating arrangement at an introduction point upstream of and proximate to the discharge arrangement, the introduction point being arranged along the longitudinal axis of the rotary drum, whereby during operation solids flow to the downstream end of the rotary drum to be discharged by the discharge arrangement and the non-condensed gases flow within the rotary drum upstream from the introduction point to an extraction point adjacent the upstream end, the recirculating arrangement being operable to cause the carbon-containing gases to preheat the carbon-containing material before its introduction into the upstream end;
(vi) means for controlling a temperature in the heating arrangement to a temperature of greater than 400° C. and less than 800° C., operable to control an amount of non-condensed gases recirculated into the interior of the rotary drum during pyrolysis of the carbon-containing material;
(vii) whereby during operation the recirculation valve is operable to control the amount of non-condensed gases recirculated into the interior of the rotary drum during pyrolysis of the carbon-containing material to control pressure in the rotary drum to approximately atmospheric pressure ±7500 Pa;
(viii) a solids outlet for obtaining carbon-containing solids from the discharge arrangement; and
(ix) means for separating metals from the carbon-containing solids.

20. A system according to claim 19 further comprising means for sensing a fill level of the rotary drum.

21. A system according to claim 20 further comprising means for maintaining the fill level of the rotary drum at less than 20%.

22. A system according to claim 19 wherein the heating means comprises combustion means for providing heat.

23. A system according to claim 22 wherein the non-condensed gases are used to power, or partially power, the heating means.

24. A system according to claim 19 wherein the non-condensed gases include at least one volatile gas.

25. A system according to claim 19 wherein the inclination is along the longitudinal axis and at an angle of up to 10°.

26. A system according to claim 19 wherein the system is operable to extract the carbon-containing gases from the upstream end of the heating arrangement for supply to the condensing arrangement.

27. A system according to claim 19 further comprising a diverter arrangement which is selectively operable to divert a proportion of the non-condensed gases to gas storage means.

28. A system according to claim 19 wherein the condensing arrangement is operated at a temperature of between 15° C. and 25° C.

29. A system according to claim 19 further comprising means for processing vehicle tyres to generate the carbon-containing material.

30. A system according to claim 29 comprising a shredder remote from the heating arrangement to process the vehicle tyres.

31. A system according to claim 19 further comprising a separator component for removing large pieces of non-carbon-containing material prior to recycling the carbon-containing material.

32. A system according to claim 19 arranged to store at least a portion of the non-condensed gases, preferably as compressed gases.

33. A system according to claim 19 arranged to produce an oil fraction suitable for use as or blending with a diesel fuel.

34. A system according to claim 19 wherein the rotary kiln has an inlet heating zone, a pyrolysis dwell zone and an output zone.

35. A system according to claim 19 wherein the heating means heats the carbon-containing material in an inlet heating zone.

36. A system according to claim 35 wherein the carbon-containing material is heated, at least partially, using the non-condensed gases.

37. A system according to claim 35 wherein the carbon-containing material is heated to a temperature of greater than 300° C. in a time of less than 60 seconds.

38. A system according to claim 19 wherein the system is operated continuously.

* * * * *